Oct. 1, 1929. T. D. STAY 1,729,631

PROCESS OF RECLAIMING SCRAP METALS

Original Filed Oct. 28, 1921    4 Sheets-Sheet 1

INVENTOR:
T. D. STAY

By B. D. Watts
ATTORNEY.

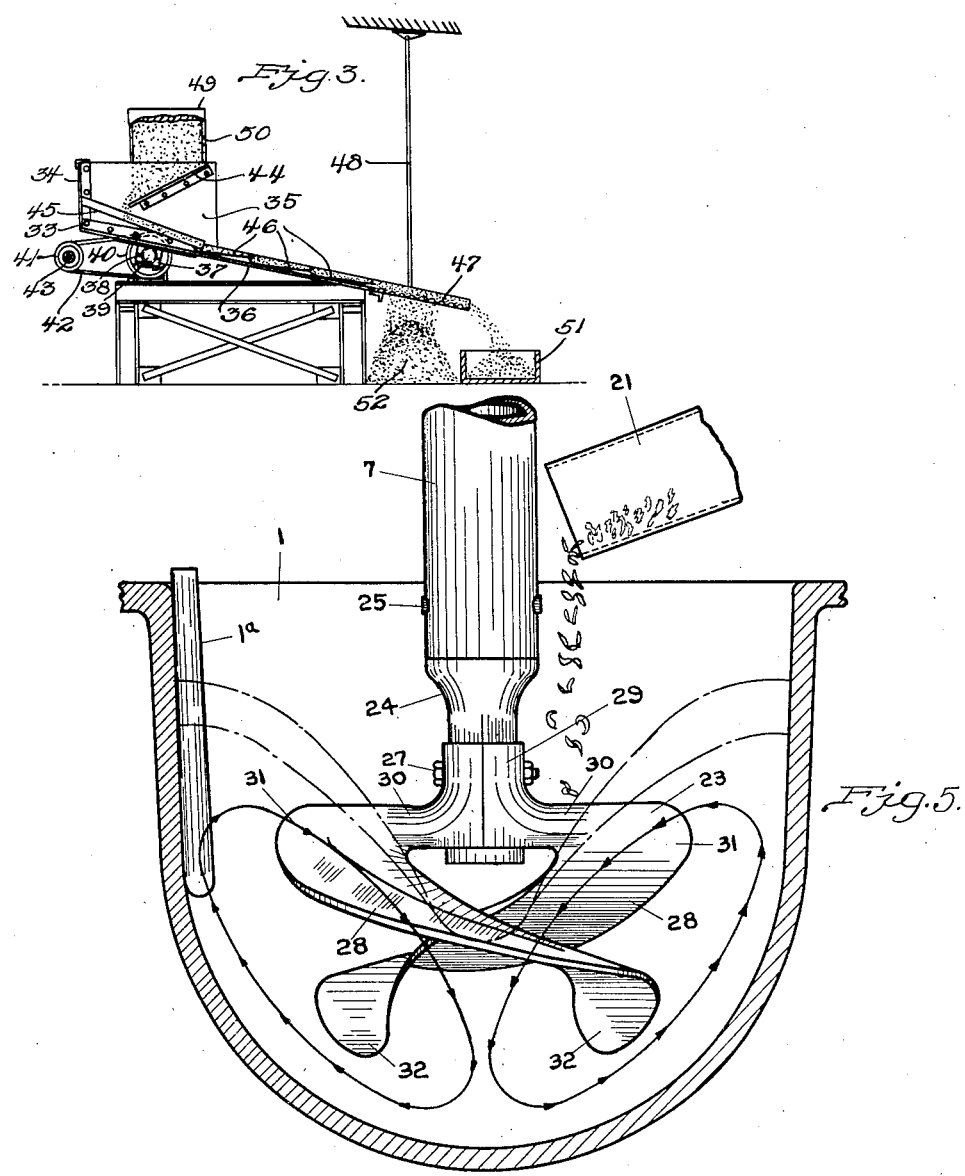
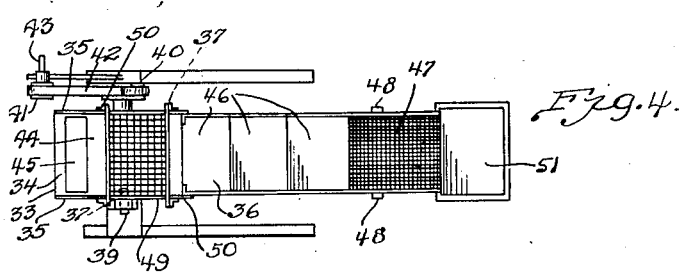

Oct. 1, 1929. T. D. STAY 1,729,631
PROCESS OF RECLAIMING SCRAP METALS
Original Filed Oct. 28, 1921 4 Sheets-Sheet 4
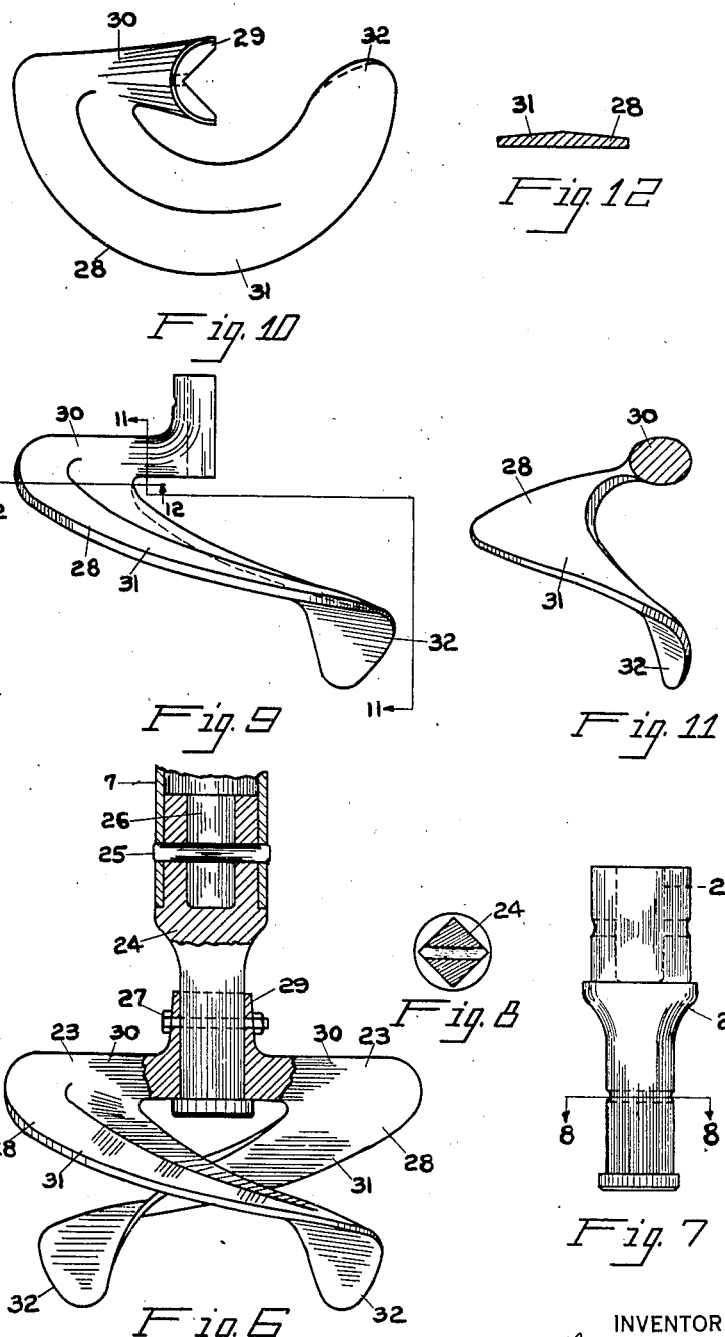

Patented Oct. 1, 1929

1,729,631

UNITED STATES PATENT OFFICE

THERON D. STAY, OF CLEVELAND, OHIO, ASSIGNOR, BY MESNE ASSIGNMENTS, TO ALUMINUM COMPANY OF AMERICA, OF PITTSBURGH, PENNSYLVANIA, A CORPORATION OF PENNSYLVANIA

PROCESS OF RECLAIMING SCRAP METALS

Application filed October 28, 1921, Serial No. 511,060. Renewed March 24, 1927.

This invention relates to the reclaiming of scrap metals such as turnings, borings, foil and the like. Altho, it is broadly applicable to many metals, in a more limited sense it is especially suited to metals having low specific gravities and being easily oxidizable both as compared with iron, such as aluminum and its alloys in particular.

The ordinary methods of reclaiming scrap metals as practiced on iron, steel and brass for example, are not adaptable to the lighter, more readily oxidizable metals such as aluminum and aluminum alloys, magnesium and magnesium alloys, and light alloys containing silicon or calcium, chiefly because no precautions are taken to prevent oxidation of the scrap metal during melting, the metal being charged into an open, empty furnace and melted down with an open flame.

The method of reclaiming aluminum and aluminum alloys as widely practiced at present is not commercially satisfactory when applied to aluminum or other light or readily oxidizable metals since it involves charging the scrap metal onto the surface of a molten metal bath in considerable quantities and then endeavoring by means of a rabble or similar apparatus to submerge the metal before it becomes oxidized. All combustible impurities burn off quickly thus leaving the unmelted, finely-divided scrap metal on the bath exposed to an oxidizing atmosphere at a high temperature until the rabble submerges it. Much metal is necessarily lost in this manner since, when once oxidized, the metal cannot be economically reduced to the metallic state. Furthermore, the previously practiced methods of separating small quantities of aluminum or its alloys from relatively large amounts of dross having about the same specific gravity as the metal result in high losses due to oxidization and incomplete separation and give an inferior product which requires further treatment, as drying or refining, before it is suitable for remelting and casting.

By my process as practiced on metals of the above defined class, however, I am able to reduce oxidation losses during melting to a minimum and to separate substantially all metal from the dross without undue oxidation, the reclaimed metal being suitable for immediate remelting and casting into ingot form and being of a superior quality due to its freedom from occluded dross or gases.

Accordingly, one object of my invention is to provide a process of efficiently melting finely-divided, oxidizable scrap metals and reclaiming substantially all of the unoxidized metal content thereof.

Another object is to provide a process of reclaiming light, oxidizable metals in scrap form in a manner to result in high quality metal substantially free from dross and occluded gases.

Another object is to provide a process of introducing oxidizable metals in scrap form into a melting furnace in a manner to prevent undue oxidation thereof and melting the metals while protecting them from oxidizing atmospheres.

Another object is to provide a process for quickly immersing light-weight metals in scrap form into a melting bath of molten metal and of protecting such metals from contact with oxidizing atmospheres until melted.

Another object is to provide a new and improved process of separating light-weight, molten metal from impurities intermingled therewith and having approximately the same specific gravity as the metal.

Another object is to provide in a scrap metal reclaiming process the steps of separating substantially all of the light-weight, molten metal from impurities of approximately the same specific gravity and of recovering such metals in a form suitable for immediate remelting and use.

Another object is to provide an improved process of reclaiming substantially all of the unoxidized metal content of oxidizable scrap metal which is simple and easy to practice and adapted to be carried out in large part by mechanical devices which are substantially automatic in operation.

Other objects will be pointed out in the following specification.

For purposes of so describing my invention that those skilled in the art may practice it I have elected to set forth in detail the process as applied to the reclaiming of aluminum or its alloys from scrap metal turnings. It is to be understood, however, that the process is applicable, with possibly minor modifications, to such metals and alloys as magnesium, silicon, calcium and other relatively light, oxidizable metals.

In the drawings which form a part of this specification:

Figure 3, is a vertical section view of screens and tables suitable for separating the dross and molten metal entrapped therein according to my improved process.

Figure 4 is a plan view of the furnace and tables shown in Fig. 3.

Figure 5, is a sectional view through the melting furnace with stirring paddle shown in elevation and in relation to the molten metal and dross during the carrying out of my invention.

Figure 6, is a side elevation partly in section of the assembled stirring paddle and shaft.

Figures 7 and 8 are respectively elevation and cross sectional views of the shaft.

Figure 9, is a side elevation of one of the blades of the stirring paddle.

Figure 10, is a plan view of the blade shown in Fig. 9, and

Figure 1:
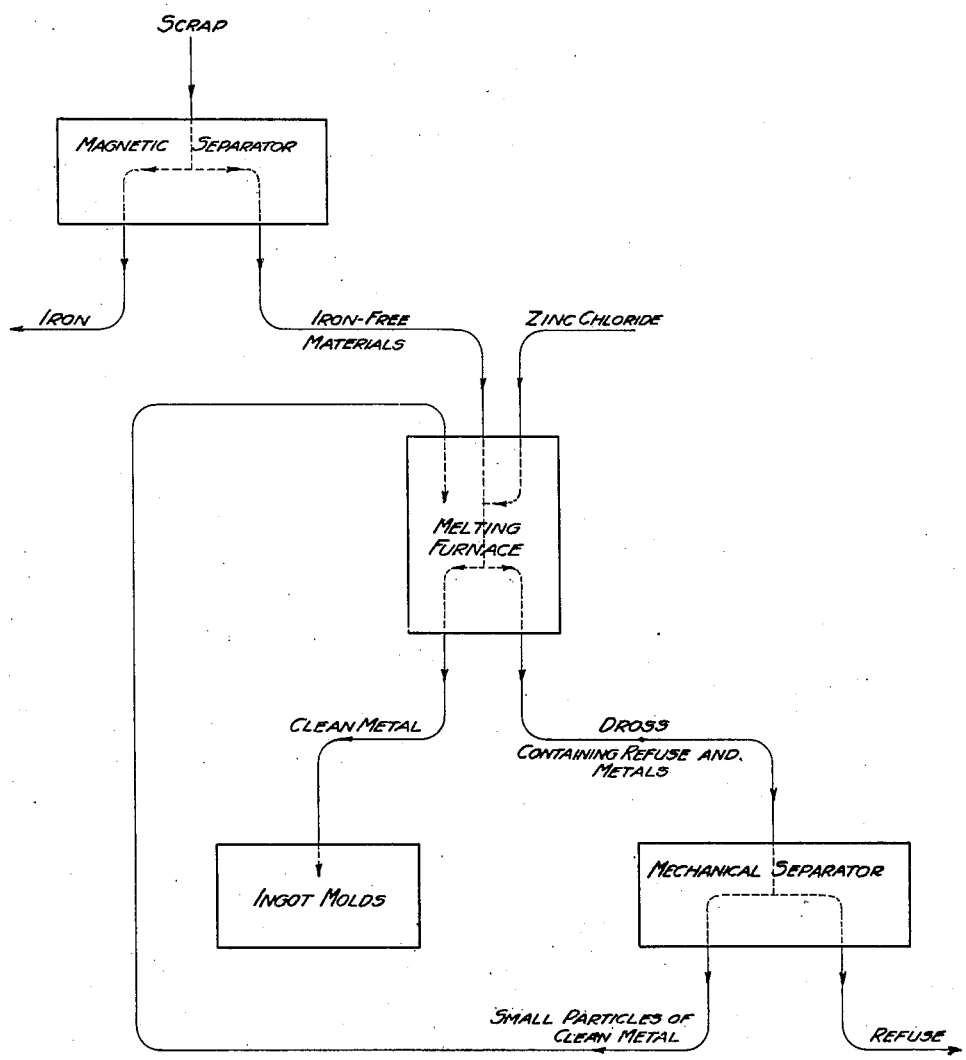
Figure 1, shows diagrammatically the various steps of the process arranged in the order of their sequence and all parts of the figure being so clearly labeled as to require no further description.

Figures 11 and 12 are respectively views taken on lines 11—11 and 12—12 of Fig. 9.

In practicing the herein described process, I may employ a melting furnace comprising a pot 1, which may conveniently be mounted within a circular chimney-like brick structure indicated at 2 in Fig. 2, oil or other fuel burners 4 which direct the flames against the pot may be mounted below the level of the floor or in any other position suitable to a proper heating of the pot and metal contained therein.

A hood 5 connecting with a flue (not shown) is arranged above the pot and is capable of being raised and lowered to permit removal of the pot and cleaning of the furnace. Suitable superstructure such as that indicated generally at 6, and consisting of uprights and cross-bars for mounting the necessary shafting, pulleys, etc., is provided adjacent the furnace. Extending vertically thru the superstructure 6 is a shaft or hollow tube 7 provided with a longitudinally extending key 8 for engagement with a keyway (not shown) carried by pulley 9 slidably mounted on the shaft near its upper end. At the extreme upper end of the shaft 7 is a yoke 10 having a swiveled bearing connected thereto. A cable 11 running over pulleys 12 and having at its free end a counterweight 13 provides means for raising and lowering the shaft 7. If desired, the cable 11 or an extension thereof (not shown) may be attached to a hand-winch, (also not shown) to render positioning of the shaft controllable at will and to permit accurate positioning of the shaft at any desired point.

Adjacent the upper end of shaft 7 is located a transverse shaft 14 connected with some suitable source of power (not shown) and bearing a pulley 15 in alignment with the pulley 9 and connected thereto by a belt 16 whereby rotational motion of the shaft 14 is communicated to shaft 7. The shaft 14 carries an irregularly shaped section 17 upon which is mounted a yoke 18, the combination of this yoke and irregular section of the shaft resulting in a rapid vibratory motion of the yoke 18. To the underside of the yoke a rod 19 with a forked lower end 19ª is attached and extends downwardly to engage with trunnions 20 on a chute 21 and serves to transmit a vibrating or shaking motion to the chute. The outer end of the chute 21 is preferably supported by a cable 22 from the superstructure so that when not in use its inner end, which normally projects over the melting pot, can be elevated and rested upon the superstructure, as is shown in dotted lines in Fig. 2, the rod 19 being disengaged from the trunnions 20 for this purpose.

At the lower end of shaft 7 the stirring paddle 23 is securely fastened. As shown in Fig. 6, the shaft 7, being hollow, has a stud 24 inserted into its lower end and pinned in place by a thru-pin 25. However, in case shaft 7 is solid an extension thereof of small diameter may be fitted into a hollowed portion 26 of the stud 24 and secured thereto by any suitable means. At the lower end of the stud 24 and secured thereto by a bolt 27 are a pair of oppositely disposed stirring blades 28. Each blade has a collar portion 29 adapted to seat on the stud 24, an outwardly extending portion 30 of so-called stream line formation from which a helically-shaped portion 31 of increasing pitch extends downwardly terminating in a tip portion 32 which is inclined abruptly to the under side of portion 31 and which also is provided with a front surface inclined outwardly.

Figure 2:
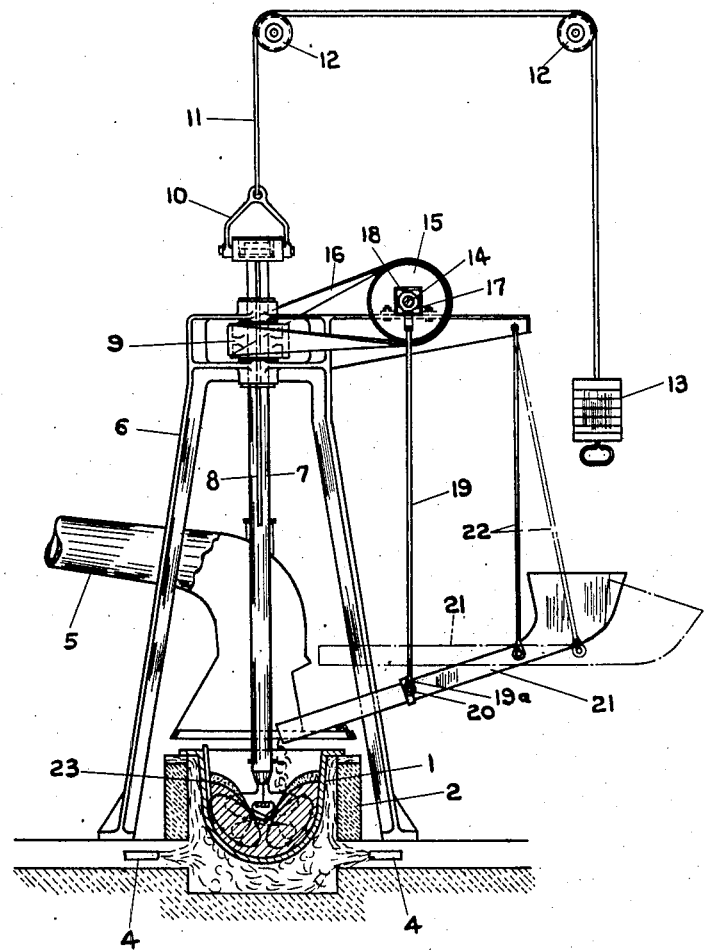
Figure 2, is a side elevation partly in section of a melting furnace and associated apparatus, suitable for use in carrying out my improved process.

When the two blades are assembled with the stud 24 and shaft 7 they comprise a stirring paddle capable of giving the liquid metal in which it rotates a downwardly and then outwardly directed motion, creating thereby a vortex at the center of the liquid and outwardly and upwardly directed currents along the sides of the pot as is indicated somewhat diagrammatically in Figs. 2 and 5. A baffle, 1ª, which may consist of a pyrometer rod jacket attached to the inner surface of the melting pot 1 retards the rotation of the liquid metal in a horizontal plane and directs the metal toward the vortex.

More than one baffle may be used, if desired, the principle upon which their action depends being the retardation of the swirling motion of the melted mass along the inner surface of the pot with a consequent deepening of the vortex by the action of the paddles at the proper slow speed at which the machine is operated.

Adjacent the furnace 1 is located a device adapted to receive dross removed from the furnace and to convert it into a finely divided condition from which the molten metal entrapped therein can readily separate. Various forms of apparatus could obviously be used for this purpose but a form which I have found satisfactory is shown in Figs. 3 and 4 of the drawings. This apparatus consists of a sheet metal frame 33 having an upright end 34, side portions 35, and an inclined bottom 36. This frame carries bearings 37 on its lower side near one end in which are journalled eccentrics 38 secured to a transverse shaft 39. This shaft is actuated by a shaft 43 connected to a suitable source of power, thru pulleys 40 and 41 and a belt 42. By reason of the eccentric arrangement, the frame 33 is vibrated vertically and horizontally so as to give a forward throw to particles passing along the tables when shaft 39 is rotated.

Secured between the sides 35 of frame 33 are a plurality of cross tables 44 and 45, the former being inclined to the horizontal at a much steeper angle than the latter. Altho several such tables could be employed, if desired, I preferably employ only two arranged substantially as shown.

If desired, the bottom 36 of frame 33 may consist of a single table but, as shown in Fig. 3, it consists of a series of tables 46 secured in overlapping position and adapted to receive material from table 45 and conduct it to the lower end of the frame 33.

A screen 47 secured in position at the extreme end of frame 33, is adapted to receive material from tables 46 and to permit fine dross material to escape therethru while passing the larger particles of solidified metal on to its end.

In addition to the bearing support 37 for frame 33, rods or other supporting means 48 are attached at the lower end of the frame and to an overhead support.

A screen 49 is mounted on uprights 50 secured to the sides 35 of frame 33 in position to discharge materials onto table 44.

According to my process, scrap metal turnings, more or less mixed with oil, dirt and other refuse is first passed thru a separator, preferably of the magnetic type, where particles of iron are removed after which the turnings pass into a melting pot or furnace containing a melting bath of molten aluminum where they are melted.

The method of introducing the metal into the melting pot which is of considerable importance is accomplished as follows: The pot is provided with a stirring means adapted preferably to form a vortex in the molten bath into the center of which the metal is fed in a slow, substantially continuous stream until the pot is filled to capacity. As the scrap metal is fed into this vortex, it is at once drawn under the surface of the bath where a downwardly directed flow of the metal serves to retain it under the surface until it melts.

The function of the stirring means is primarily to immerse the scrap metal in the molten metal bath immediately upon its delivery to the pot and to keep it submerged and thus protected from oxidizing atmospheres until melted. A preferred form of stirring means is disclosed in co-pending application Serial No. 511,021, filed Oct. 28th, 1921, which, in part, consists of a paddle, capable of being rotated, and raised and lowered in the bath and having two helically shaped arms each terminating in a vertical downwardly extending and outwardly tapered tip. The operation of this paddle is, I believe, substantially as follows. Rotation of the paddle sets up a whirling action of the bath and a circulation of metal up along the sides of the pot and down thru the center thereby forming a vortex at the center of the bath while avoiding all splashing of the molten metal.

As the scrap metal is added the combustible impurities carried by it rise to the surface and burn, thereby creating a reducing atmosphere over the bath which effectively prevents oxidation of the molten metal. Since the scrap metal is added substantially continuously until the pot is filled, a reducing atmosphere is maintained over the bath during the entire melting operation.

When the scrap metal begins to melt, the surface coverings thereof consisting of oxides and other impurities are distributed thruout the bath, forming dross having a specific gravity only slightly less than that of the molten metal. Some of this dross finds its way to the surface of the bath where it appears in the form of a fluffy froth-like mass having a metallic luster, but in order to concentrate all the dross at the surface of the bath, when the pot has become full, the rotated stirring paddle is lowered to the bottom of the bath and then gradually raised out of the bath thereby causing an agitation tending to send the dross to the top of the metal. Naturally considerable quantities of molten metal are intermingled with the dross due to the fact that both metal and dross are of about the same specific gravity.

The next step is to alter the form of the dross to facilitate separation therefrom of the molten metal intermingled therewith, which alteration is accomplished by adding small quantities of a chemical reagent to the dross. Altho various compounds may be used such as chlorides, fluorides, carbonates, etc., of metals which are not harmful or undesirable in the molten metal, I prefer to employ zinc chloride.

Zinc chloride apparently reacts chemically with the dross, and while the exact nature of the reaction is not thoroly understood it results in creating localized, intense heat, and transforming the fluffy, froth-like dross into a glowing mass containing molten metal of increased fluidity. Some metal drains out of the dross but much is retained by it since it tends to matt together into soft lumps which harden on cooling. Only with difficulty is this metal recovered from the lumps after they harden and cool, and high oxidation losses result since, due to the high continued temperature within the lumps, the greatest portion of the metal is quickly oxidized.

The next step of my process, that of breaking up the lumps of dross and separating and recovering the molten metal therefrom, is preferably accomplished in three stages. First, the dross is skimmed off the bath in skimmers having perforated bottoms, much of the molten metal in the dross draining thru the perforations and into the bath when the skimmer is shaken or jarred. Second the lumps are broken up immediately in contact with the air, the metal escaping in the form of molten globules which are then quickly cooled below the temperatures at which oxidation takes place most readily and are amalgamated or united into larger globules. The dross is, of course, cooled during and immediately after the disintegration of the lumps due in part to the cooling effect of the mechanical separator and in part, no doubt, to the removal of the metallic aluminum from the hot substances in the dross which tend to promote oxidization of the aluminum and thus continue the intense heat of the dross.

Third, solidification of the metal and subsequent screening finally separates the metal from all dross, the metal being ready for immediate return to the melting bath for remelting and casting into pig or ingot form.

After removal of the dross from the bath, and preferably before the solidified metal recovered from the dross is returned to the bath, part of the clean, molten metal in the pot is removed and cast into ingots for subsequent alloying or other purposes as may be desired, the remainder being left in the pot as a bath for the next batch of turnings.

Preferred means for effecting this separation is disclosed in detail in the co-pending application above referred to. Briefly it consists of, first, a vibrating screen or other means of breaking up the lumps of dross, a vibrating table arranged to catch the material passing thru the screen to cool it quickly to solidification and a screen for separating the fine dross from the solidified metal.

The term "substantially all" as used herein to describe the proportion of aluminum separated and recovered from the dross will be understood to refer to and include all metal particles which are of a size suitable to be melted commercially in a molten metal bath. It will be understood by those skilled in the art, that when relatively small particles of the metals here concerned are thrown on to a molten metal bath containing similar metals they tend to float on the surface thereof and oxidize as contrasted with melting, in fact often oxidizing some of the bath metal. Such small particles are excluded from the term "substantially all" as employed herein.

It will be obvious to those skilled in the art that my process is applicable to many metals including those specified hereinabove. Accordingly, I do not desire to have my invention limited to the specific steps and metals above set forth in detail for purposes of illustration. The scope of my invention is defined by what is claimed.

1. The improved process of reclaiming light, readily oxidizable metals from finely divided scrap metal which comprises freeing the scrap metal particles of iron, adding the scrap metal to a molten bath of metal of the kind to be reclaimed in which there are upwardly and downwardly directed currents of circulation, quickly immersing the scrap metal in the molten bath, continuing the said currents of circulation and causing the impurities to collect in the form of dross on the surface of the bath, heating the dross, removing the dross from the molten bath, and immediately separating therefrom and agglomerating, under atmospheric conditions, substantially all the molten metal entrapped therein.

2. The process of reclaiming light, readily oxidizable metals from finely divided scrap metal which comprises freeing said scrap metal of particles of iron, providing a molten bath containing metal of the kind to be reclaimed in which there is a vortex and upwardly and downwardly directed currents, gradually feeding the said scrap metal into the vortex of the said bath and quickly submerging it beneath the surface thereof, segregating substantially all of the impurities of the bath in the form of dross on the surface of the bath, intensely heating and altering the form of the said dross to a glowing mass and liberating a portion of the molten metal entrapped therein, removing the said altered dross from the bath and quickly separating a further portion of the metal entrapped therein, under atmospheric conditions and without further substantial oxidation losses thereof.

3. The improved process for reclaiming aluminum or its alloys from finely divided aluminum scrap metal which comprises providing a molten bath of aluminum, agitating the same to cause downwardly directed currents therein, gradually feeding the scrap metal into the said molten bath and quickly submerging it therein, continuing the agitation of the molten metal bath until the impurities are largely concentrated as a dross at the surface thereof, adding to the dross a flux of a nature and quantity to produce intense heat, skimming the highly heated dross from the molten bath, quickly breaking up and cooling the same and separating the molten aluminum contained therein from the impurities 4. The improved process of reclaiming aluminum or its alloys from finely divided aluminum scrap metal which comprises providing a molten bath containing aluminum, agitating the bath to cause upwardly and downwardly directed currents therein, gradually feeding the scrap metal into the said molten bath and quickly submerging it therein while continuing the agitation of the bath, causing the collection of substantially all of the impurities as a dross on the surface of the bath, adding to the dross a substance adapted to cause an intense heating of the dross and to alter its form to a glowing mass, skimming the highly heated dross off the molten bath, quickly disintegrating the dross and simultaneously liberating in molten form the small particles of aluminum entrapped therein, agglomerating and chilling the liberated molten aluminum, and freeing it from substantially all dross.

5. The improved process of reclaiming aluminum or its alloys from finely divided aluminum or aluminum alloy scrap metal which comprises providing a molten bath containing aluminum, agitating the bath to cause upwardly and downwardly directed currents therein, freeing the scrap metal of particles of iron, gradually feeding the scrap metal into the said molten bath and quickly submerging it therein while continuing the agitation of the bath, causing the collection of substantially all of the impurities as a dross on the surface of the bath, adding to the dross a small amount of flux containing a metal salt, which flux is adapted to cause an intense heating of the dross and to alter its form to a glowing mass, skimming the highly heated dross off the molten bath and permitting a part of the molten metal entrapped therein to escape therefrom, quickly disintegrating the dross and simultaneously liberating in molten form substantially all the remaining aluminum entrapped therein, agglomerating and chilling the liberated molten aluminum, and freeing it from substantially all dross.

6. In a process for reclaiming light, readily oxidizable metals from aluminum containing dross, the steps of intensely heating the dross and altering its form to a glowing mass, removing the heated dross from the molten bath, quickly disintegrating and cooling the dross and simultaneously separating therefrom the entrapped metal in molten form and agglomerating and chilling the molten metal.

7. The improved process of reclaiming aluminum or its alloys from aluminum containing dross, which comprises the steps of heating the dross to a temperature well above that of the molten bath, removing the dross from the bath, quickly disintegrating the dross and simultaneously separating therefrom in molten form the aluminum entrapped therein and then chilling the molten aluminum and freeing it from substantially all dross.

8. The improved process of reclaiming light, readily oxidizable metals from finely divided scrap metal which comprises adding the scrap metal to an agitated molten bath of metal of the kind to be reclaimed, quickly immersing the scrap metal in the molten bath, continuing the agitation of the bath and causing the impurities to collect in the form of dross on the surface of the bath, heating the dross above the temperature of the bath, removing the dross from the molten bath, and immediately separating therefrom and agglomerating, under atmospheric conditions, substantially all the molten metal entrapped therein.

9. In a process for reclaiming aluminum or its alloys from aluminum containing dross, the steps of creating a high intense heat in the dross mixture and then quickly disintegrating, cooling the said dross mixture, and separating and recovering the molten aluminum entrapped therein.

10. In a process of reclaiming aluminum or its alloys from finely divided aluminum or aluminum alloy scrap metal, the steps of highly heating dross containing entrapped aluminum, separating part of the entrapped aluminum from the highly heated dross while removing the latter from the surface of a molten metal bath, then, while exposed to the atmosphere, quickly disintegrating the dross and liberating the molten metal entrapped therein, then causing the small globules of molten metal to join with other similar globules to form large globules of molten metal, and finally chilling the globules of molten metal without further substantial oxidation thereof.

11. In a process for reclaiming aluminum or its alloys from finely divided aluminum-containing scrap metal, the steps of creating a high intense heat in an aluminum-containing dross mixture floating on a molten metal bath, quickly removing the dross from the bath and disintegrating the same at once thereby liberating molten aluminum or its alloys entrapped in the dross mixture.

12. In a process for reclaiming aluminum or its alloys from finely divided aluminum-containing scrap metal, the steps of creating a high intense heat in an aluminum-containing dross mixture floating on a molten metal bath, quickly removing the dross from the bath and disintegrating the same at once thereby liberating molten aluminum or its alloys entrapped in the dross mixture and recovering the still molten aluminum under atmospheric conditions without substantial oxidation thereof.

13. The method of recovering metallic aluminum from hot aluminum dross or the like, containing finely divided particles of molten aluminum, which comprises conveying said dross longitudinally of a container and meanwhile reducing the dross to a finely divided condition thereby liberating molten metal entrapped therein, causing particles of said molten aluminum to agglomerate, and removing said aluminum from said container.

14. In a process of reclaiming aluminum or its alloys from finely divided aluminum or aluminum alloy, scrap metal, the steps of quickly disintegrating hot dross containing molten aluminum in the form of small globules, quickly cooling the liberated globules, and separating the metallic aluminum from the dross.

In testimony whereof I affix my signature.

THERON D. STAY.